(12) United States Patent
Schmitt-Walter et al.

(10) Patent No.: US 7,435,924 B2
(45) Date of Patent: Oct. 14, 2008

(54) DRIVE DEVICE FOR WELDING TONGS

(75) Inventors: Stefan Schmitt-Walter, Oberhaching (DE); Robert Hartmann, Munich (DE)

(73) Assignee: SWAC Electronic GmbH, Zug (CH)

( * ) Notice: Subject to any disclaimer, the term of this patent is extended or adjusted under 35 U.S.C. 154(b) by 43 days.

(21) Appl. No.: 10/503,756

(22) PCT Filed: May 5, 2003

(86) PCT No.: PCT/EP03/01136

§ 371 (c)(1),
(2), (4) Date: Mar. 7, 2005

(87) PCT Pub. No.: WO03/066269

PCT Pub. Date: Aug. 14, 2003

(65) Prior Publication Data

US 2005/0150873 A1    Jul. 14, 2005

(30) Foreign Application Priority Data

Feb. 5, 2002   (DE) .............................. 202 01 734 U
Jun. 21, 2002  (DE) .............................. 202 09 668 U (51) Int. Cl.
*B23K 11/11* (2006.01)
(52) U.S. Cl. .................................... 219/86.33; 219/90
(58) Field of Classification Search ................ 219/86.1, 219/86.25, 86.31, 86.32, 86.33, 86.41, 90
See application file for complete search history.

(56) References Cited

U.S. PATENT DOCUMENTS

| | | | | |
|---|---|---|---|---|
| 3,396,261 A | * | 8/1968 | Kirsch | 219/90 |
| 3,402,308 A | | 9/1968 | Henschke | 310/80 |
| 5,321,225 A | * | 6/1994 | Boyer | 219/89 |
| 5,750,953 A | * | 5/1998 | Sato et al. | 219/90 |
| 5,928,531 A | * | 7/1999 | Sato et al. | 219/86.25 |
| 6,064,028 A | | 5/2000 | Schmid-Doernte | 219/86.41 |
| 6,225,590 B1 | | 5/2001 | Farrow | 219/86.41 |
| 6,337,456 B1 | * | 1/2002 | Taniguchi et al. | 219/86.25 |
| 6,392,185 B1 | * | 5/2002 | Beffrieu et al. | 219/86.33 |
| 6,469,272 B2 | * | 10/2002 | Dugas et al. | 219/86.32 |

(Continued)

FOREIGN PATENT DOCUMENTS

DE     37 43 341 A1    6/1989

(Continued)

*Primary Examiner*—Kevin P Kerns
(74) *Attorney, Agent, or Firm*—Flynn, Thiel, Boutell & Tanis, P.C.

(57) ABSTRACT

A drive device for a pair of welding tongs having a pair of limbs, is arranged between the adjusting ends of the limbs, located opposite to the welding electrodes, for adjusting between a welding position and a standby position. In order to reduce its length, provide continuous control and monitoring, simplify the device and reduce noise, the drive device is provided with an electric motor-driven screw-thread drive with a rotating nut and a rotating spindle which is axially displaceable between an extended and a return position, the spindle being connected to an adjusting end of the limb. The drive device can be used as a main drive for a pair of welding tongs for the positioning of the limbs, or can be used as a secondary drive, for setting of a stopping position of the pair of welding tongs.

39 Claims, 6 Drawing Sheets

U.S. PATENT DOCUMENTS

| | | | |
|---|---|---|---|
| 6,479,783 B2 * | 11/2002 | Tiberghien et al. | 219/86.32 |
| 2003/0132201 A1 | 7/2003 | Kaeseler et al. | 219/86.41 |

FOREIGN PATENT DOCUMENTS

| | | |
|---|---|---|
| DE | 41 12 350 A1 | 1/1992 |
| DE | 43 06 492 C1 | 7/1994 |
| DE | 43 04 790 A1 | 8/1994 |
| DE | 195 34 845 C1 | 10/1996 |
| DE | 299 17 213 U1 | 3/2001 |
| EP | 0 761 367 | 3/1997 |
| EP | 0 761 367 A1 * | 3/1997 |
| EP | 0 830 916 A1 * | 3/1998 |
| EP | 1 010 491 A2 * | 6/2000 |
| EP | 1 089 019 | 4/2001 |
| EP | 1 089 019 A1 * | 4/2001 |
| EP | 1 138 434 | 10/2001 |
| EP | 1 138 434 A1 * | 10/2001 |
| EP | 1 221 351 A | 7/2002 |
| EP | 1 221 351 A1 * | 7/2002 |
| GB | 1 075 872 * | 7/1967 |
| JP | 07 290251 | 11/1995 |
| JP | 7-290251 A * | 11/1995 |
| WO | WO99/38640 | 8/1999 |
| WO | WO 99/38640 A1 * | 8/1999 |
| WO | WO 03/024657 A1 * | 3/2003 |
| WO | WO03/024657 A1 | 3/2003 |

\* cited by examiner

DRIVE DEVICE FOR WELDING TONGS

FIELD OF THE INVENTION

The present invention refers to a drive device for welding tongs particularly comprising a pair of limbs formed for instance as double-armed levers, said drive device being arranged substantially between two adjusting ends of the limbs or levers which are located opposite to the welding ends provided with welding electrodes for pivoting at least one limb or lever between the welding position and the standby position.

BACKGROUND OF THE INVENTION

Normally, welding tongs with a pneumatic drive device for generating a respective electrode power are used nowadays in industry, for instance in the automobile production. The pneumatic drive devices causes, particularly if the welding tongs are formed with a pair of limbs or double-armed levers, these limbs or levers to be moved from their standby position into their welding position, in which they oppositely press onto sheets to be welded together. Upon reaching an adequate electrode power, a welding current is supplied to the welding tongs and the welding of the sheets takes place. Subsequently, the limbs of the welding tongs, hereinafter referred to as levers, are moved back into their standby position and the welding tongs are moved for instance by means of a robot to the next welding position.

When using welding tongs with a pneumatic drive device it turned out that the drive is relatively uncomplicated and easy to maintain and can be controlled and monitored in a simple way. However, the electrode power in a pneumatic drive device can hardly be controlled during the welding process. When adjusting the levers to the standby position, the welding electrodes impinge onto the workpiece. Neither during adjustment of the levers from the standby position to the welding position nor vice versa during the welding process is a position monitoring of the levels by means of the drive device possible. The pneumatic operation of the drive device also leads to a high noise level and great effort for the installation of the respective pneumatic supply system. Moreover, air permanently escapes, which leads to a further noise pollution.

Moreover, it must be noted that the pneumatic drive device's construction length between the adjustment lever ends is relatively large. The construction length is, however, important in connection with the maximum possible opening angle of the levers. That means that if the construction length of the drive device and the lever length is predefined, the maximum opening angle of the level in the standby position results, which is variable only by changing the construction length or the lever length. The size of the maximum opening angle is important to be able to move the welding tongs from one welding position to the other without colliding with the workpiece.

SUMMARY OF THE INVENTION

In view of the above-mentioned prior art, the subject matter of the application is based on the object to improve the drive device for welding tongs in that these tongs have a small construction length, the drive device can substantially be controlled and monitored in a continuous manner and has a simple structure, which is cost-effective and easy to maintain, wherein the noise pollution by the drive device is significantly reduced.

This object is solved in connection with the features of the invention in that the drive device comprises an electric motor-driven screw thread drive with a rotating nut and a spindle axially adjustable between the extended position and the return position, the free extended end of the spindle being movingly connected to an adjustment end of a limb or lever arm.

The electric motor-driven drive enables the supply of the drive device in a simple manner via electrical lines. A complex pneumatic supply system is not required. Furthermore, the electric motor-driven drive enables that in a simple manner a control of the monitoring of the position of the welding electrodes or levers of the welding tongs is possible. This may for instance be implemented by a respective monitoring of the relative arrangements of rotating nut and spindle. Moreover, the electrode power can easily be monitored or adjusted before, during and after termination of the welding process. According to the invention it is also possible to adjust any intermediate position between the welding position and the standby position so that the levers (limbs) of the welding tongs when moving towards a further welding point must not necessarily be pivoted back into the standby position. In this connection is may be sufficient if the levers and thus the welding electrodes are spaced apart to such an extent that a movement of the welding tongs to the next welding point is possible.

The electric motor-driven drive with a screw thread drive according to the invention is extremely quiet, simple and has a cost effective design. Moreover, a small construction length between the adjustment lever ends results, since the spindle in its return position only slightly projects over the rotating nut.

In order to refrain from using expensive bearing means for the rotating nut, this nut can be formed with an integrated radial and axial bearing means.

In order to obtain a favourable mechanic efficiency as a result of low rolling friction, substantially no stick-slip effect and a low wear thus leading to a long life, the screw thread drive is formed as a ball screw. Such a ball screw further comprises a high positioning and repetition accuracy as well as a high path feed rate. Of course, it is also possible that different screw thread drives are used, such as a trapezoidal thread, planetary gear train or the like or also a pinion drive or the like.

In order to protect the screw thread drive to the greatest possible extent from being soiled, the drive device may have a sleeve-shaped drive housing with a holding shoulder at least partially revolving therein, wherein the rotating nut is held rotatable at the holding shoulder but is supported in an axially unmovable manner. It must be noted that accordingly the spindle is substantially arranged in the drive housing at least in its return position. The holding shoulder revolving in the inside of the drive housing may also be formed as a fully revolving substantially radially inwardly projecting holding shoulder.

The invention can be used in C-shaped welding tongs, X-shaped welding tongs or also other welding tongs.

In order to be able to simply attach the rotating nut within the drive housing, a bearing ring may be fixed for co-rotation with the holding shoulder or it may be connected to the shoulder in a detachable manner, wherein the rotating nut is rotary relative to the bearing ring. The bearing ring may in this connection be set onto the outside of the rotating nut and it may be supported in a rotary manner relative to same e.g. by means of adequate ball bearings, or it may be supported in an axially immovable manner. In this connection, the bearing ring forms part of the radial and axial bearing means for the rotating nut, wherein the support can be implemented by axial bearings, angular ball bearings, rolling bearings, needle bearings or the like, wherein these bearings may also be arranged in pairs.

In order to further improve the position accuracy and reproducibility of adjustment of the screw thread drive, the rotating nut may be preloaded for a support free from backlash.

In order to obtain an electric motor-driven drive that can well be controlled and supplied, this drive may be an especially brushless servo motor. However, other DC motors or the like may also be used instead of a servo motor.

In order to obtain a favourable accessibility of the drive device e.g. for maintenance purposes, the drive housing may be closed by a cover particularly in a detachable manner on the housing end opposing the free extended end of the spindle.

In order to be able to design the electric motor-driven drive in a compact manner in order to reduce the construction length, the servo motor may comprise a stator arranged within the drive housing in a manner particularly fixed for co-rotation, and a rotor rotatably arranged therein, which is movingly connected to the rotating nut particularly in a non-positive way.

The construction length can further be reduced in that the rotor is formed as a rotor sleeve into which the spindle is at least partially retracted in its return position. That means that in the return position of the spindle, the rotor sleeve surrounds the spindle in a manner that the servo motor forms part of the return space of the spindle.

A simple movement connection between rotating nut and rotor sleeve can be seen in that the rotor sleeve is fixed for co-rotation with the rotating nut particularly at its front side at the first end of the rotor sleeve pointing away from the cover.

In order to be able to determine in a simple and compact manner the position of the rotor sleeve and the rotating nut connected therewith and thus also the spindle, a position transmitter may be associated to the rotating nut and/or the rotation sleeve. By this position transmitter the respective rotary position of the rotary sleeve and accordingly the rotary position of the rotating nut can be determined. If the rotary position of the rotating nut is known, the adjustment of the spindle can also be determined.

In order to be able to directly correlate the measured value with a respective rotary position of the rotor sleeve or rotating nut, the position transmitter may be an absolute value transmitter. Such an absolute value transmitter may e.g. digitally-absolutely measure the position. Other position transmitters are also possible, which carry out an analogue measuring, such as a resolver or the like.

In order to be able to connect the spindle and the adjusting lever end of the respective lever with one another in a simple way, a bearing block may be arranged as a bearing means for the adjusting lever end at the extended end of the spindle particularly in a detachable manner.

In order to de-couple the rotary movement of the spindle upon its adjustment by the rotating nut from the pivoting of the lever, the extended end of the spindle must be fixed for co-rotation in the bearing block.

In order to protect the screw thread drive particularly during extension of the spindle from being soiled and in order to protect a worker from a possible injury caused by the screw thread drive, a protective means variable in length surrounding the spindle may be arranged between the bearing block and the holding shoulder. This protective means fully surrounds the spindle and extends up to the drive housing.

A simple example for such a protective means is if the protective means is formed as a bellows.

A further possibility for a protective means is a helical spring cover. This cover is formed by a thin, wound-up sheet or the like which can be helically extended, wherein one end is attached directly or indirectly at the bearing block and the other end is substantially attached directly or indirectly on the holding shoulder. Such a helical spring cover for instance has the advantage that it is insensitive to sweat droplets.

In order to keep the bellows at a distance to the rotating nut, this nut can be surrounded by a substantially hat-like cover on its end pointing towards the extended end of the spindle, said cover sealingly contacting the outer periphery of the spindle. In this connection it must be noted that the hat-shaped cover does not have to extend fully in the circumferential direction around the rotating nut but can also be formed for instance essentially bracket-shaped.

The cover may particularly detachably be attached on a side of the holding shoulder pointing away from the bearing ring. Moreover, the part of the cover that contacts the outer periphery of the spindle may at the same time be used as a lubricant supply means.

In order to be able to support the adjusting lever end of the other lever in a simple manner at the drive device, the cover may comprise a second bearing block as a bearing means for supporting the adjusting lever end of the further lever.

In order to simply enable an appropriate pivoting of the levers when adjusting the spindle, each bearing block may have a transverse bore extending substantially perpendicular to the longitudinal axis of the spindle, in which said transverse bore a shaft particularly detachably connected to the respective adjusting lever end is rotatably supported. An rotatable support may in this connection be implemented by a number of bearings such as separable bearings, cross roller bearings, radial ball bearings and the like. It is also possible that a plurality of these bearings are provided.

In order to support the shaft with a high bearing capacity and to also receive axial forces, at least two taper roller bearings or separable bearings may be set onto the shaft in a laterally reversed manner.

To enable in this connection a bearing of the adjusting lever end substantially free from backlash, each taper roller bearing may particularly be pre-loaded by means of a thread ring.

A simple possibility of such a clamping can be realized in that opposing abutment sections for the taper roller bearings are arranged within the transverse bore and/or on the shaft.

In order to be able to attach the adjusting lever ends in a simple manner to the respective bearings or bearing blocks, particularly detachably fixed insertion caps may be arranged on both sides of the transverse bore at the shaft. These caps may particularly comprise conical attachment bores. These insertion caps serve for attaching the adjusting lever ends at the bearing block. The adjusting lever ends may particularly be shaped in a forklike manner so that an attachment of the fork ends on both sides of the transverse bore can be implemented through the insertion caps.

The conical attachment bores particularly serve for the fact that respective shaft ends of the shaft arranged in the transverse bore are received by them, wherein the conical design of the attachment bore ensures a fixed seat of the shaft, but at the same time also enables a simple release of the insertion caps.

In order to clamp the taper roller bearings when attaching the insertion caps, an intermediate ring that can be screwed onto the shaft may exist as a lateral, adjustable abutment surface for a taper roller bearing. That means that for instance a taper roller bearing is clamped by the respective, above-mentioned abutment shoulders, whereas the second taper roller bearing laterally reversed thereto is clamped only by attachment of the respective insertion cap and particularly by the lateral abutment surface of the intermediate ring screwed-on.

In order to secure the intermediate ring in its screwed-on position, a safety sheet can be arranged between the insertion cap and the intermediate ring.

The possibility exists that the insertion cap has a cross section in its axial direction at least at one portion onto which a respective adjusting lever end can be plugged on in a positive-fit manner. An example for such a cross section is an angular cross section, such as quadrangular, pentagonal or hexagonal. In order to improve the connection between the insertion cap and the shaft, the insertion cap may have at least one screw bore for attachment on the shaft.

In order to additionally prevent the adjusting lever end from sliding down, the insertion cap may have a substantially radially outwardly projecting abutment flange on its end pointing away from the shaft. That means that the adjusting lever end or its fork end is arranged between the abutment flange and the lateral openings of the transverse bore.

In order to enable a higher power load of the drive device, cooling ribs may be arranged on the outside of the drive housing.

When retracting and extending the spindle and when correspondingly operating the welding tongs, tilt momentums in the area of the drive means may occur. In order not to transfer them onto the screw thread drive, at least two guide rods may be arranged substantially in parallel to the longitudinal axis of the spindle, said guide rods being attached at least at their ends with the drive housing and/or the bearing means.

In order to form the drive device according to the invention more compact and in order to be capable of well receiving the tilt momentums, each guide rod may be guided in a longitudinal bore within the drive housing. At its ends the guide rod in the longitudinal bore is e.g. clamped by screws or the like screwed on.

In order to well receive the tilt momentums, the longitudinal bores may substantially be arranged in extension of the adjusting lever ends. If the adjusting lever ends are formed in a fork-like manner, a respective longitudinal bore with a guide rod may be arranged in extension of each fork.

According to the invention it results from the previous features that the drive device is formed in an extremely compact manner and as a substantially integrated unit with a screw thread drive, an electric motor-driven drive and a bearing means for the adjusting lever ends.

In order to be able to supply in such a compact unit sufficient lubricant to all moving parts, a respective lubricant supply system with at least one lubricant supply channel may advantageously be integrated within the drive housing and/or the bearing means. In this connection, the possibility also exists that a lubricant distribution system for all movable parts within the drive housing and within the bearing housing is provided, see the description of the bearing blocks with the transverse bore, shaft and taper roller bearing.

In another embodiment of the invention, the spindle may be arranged in a spindle sleeve, which is rotatably connected to the rotating nut. The spindle sleeve protects the spindle and it is longitudinally adjustable in this sleeve between its extended and its return position.

In order to be able to support the rotor in a simple manner in the previous embodiments, the rotor may be arranged on the outside of the spindle sleeve. The stator is arranged in accordance with the drive housing so that the rotor is rotary together with the spindle sleeve and the rotating nut.

In order to lock the spindle sleeve on its end opposing the rotating nut, the rotary cap may be attached at this end of the spindle sleeve in a particularly releasable manner. The releasable attachment leads to a facilitated accessibility to the interior of the rotary sleeve and thus for instance to the spindle.

In order to be able to rotatably support the spindle and thus the rotating nut with respect to the drive housing in a simple manner, at least one bearing means may be arranged between the spindle sleeve and the drive housing. An example for such a bearing means are ball bearings or roller bearings, wherein double-row bearings, such as double-row separable bearings or the like have further advantages.

In order to fix the spindle sleeve in the longitudinal direction with respect to the bearing means, the bearing means may be arranged between a radially outwardly projecting step section of the spindle sleeve and an intermediate ring. The intermediate ring may be screwed onto the outer side of the spindle sleeve or it may be attached releasable in a different manner.

In order to support the spindle sleeve also in the area of its step section adjacent to the rotating nut, an attachment ring that may particularly be screwed on can be associated to the step section of the spindle sleeve. This attachment ring is e.g. attached in the interior of the drive housing, particularly on a holding shoulder projecting radially towards the inside. The attachment may be implemented via screws or other means.

In order to ventilate the protective means when retracting and extending the spindle, a ventilation means may be associated to the protective spindle. This means comprises for instance air-pervious, porous members made of plastics or metal, arranged in the cover, said members communicating through respective lines with the interior of the protective means. An air exchange takes place through these lines and the porous members substantially acting as air exchange attenuators, so that during each extension of the protective means fresh air (cool) may be sucked into the drive device or actuator device for cooling and is discharged as heated exhaust air during each retraction.

The invention further refers to welding tongs having at least two limbs movable relative with respect to each other and provided on the welding ends with an electrode or counter electrode, said limbs may be formed as double-armed levers, and a fixing means associated to the operating ends of the limbs opposing the welding ends, wherein a releasable fixing means for defining at least one fixing position of this limb is arranged between at least one limb or lever and a fixed point.

Welding tongs of this type are known from DE 195 34 845 C1. The known welding tongs are formed as so-called scissors welding tongs with two limbs. The limbs can be pivoted by means of a joint relative to one another. The joint and thus the welding tongs can be pivoted through a pivot bolt.

On their welding ends the respective limbs are provided with an electrode or a counter electrode. The respective sheet members of particularly spatially designed bodies are welded by means of these electrodes, wherein the welding tongs are usually attached at a program-controlled robot or the like. For the relative movement of the limbs a drive means is associated to the operating ends of the limbs opposing the welding ends. This device is pneumatically or hydraulically operable regarding the welding tongs known from DE 195 34 845 C1.

Furthermore, a releasable locking means is arranged between a fixed point provided on a base plate of the welding tongs and at least one limb. Through this locking means at least one locking position of the respective limb can be defined. The locking means is formed as a double-acting actuator cylinder with a piston and it may be operated pneumatically or hydraulically.

The disadvantage in these known welding tongs is that the locking means through the hydraulic or pneumatic operation can basically define a limb in one certain fixing position only. That means that the respective limb is either fixed or it is pivotal. A variation of the locking position or selectable locking positions are not possible. Furthermore, the possibility does not exist to slightly vary the locking position once chosen if this becomes necessary before, during or after the welding operation of the welding tongs.

To also reproducibly enable in a simple manner a precise and variable adjustment of different locking positions, the locking means may be an electrically operated actuator means with a variable adjustment of the locking position. By the selection of the actuator means, different locking positions by respective electric operations of the actuator means can simply be realized. Moreover, locking positions once taken can also me minimally varied in a simple manner in case this becomes necessary. Due to the electric drive of the actuator means this is easily reproducible and it can be controlled precisely for adjusting a respective locking position.

Moreover, an expensive pneumatic or hydraulic supply system is no longer required when using the electric operation of the actuator means.

A simple embodiment of such an electrically operated actuator means can be seen in that it is formed as a drive device, as described above.

According to the invention, a tongs compensation can be carried out by the actuator means particularly before and/or after a welding process. That means that before or after the welding process a respective fixed limb is pivoted about the measure of a tongs compensation.

It would be possible that the drive device is operated pneumatically or hydraulically. However, the entire structure of the drive device can further be simplified if it comprises in the same manner an electrically driven screw thread drive with a rotating nut and an axially adjustable spindle between the extended and the return position, said spindle being movingly connected with its free extended end with an adjusting end of a limb. This leads to a small construction length of the welding tongs. The drive device can be controlled and monitored substantially continuously for operating and/or locking the welding tongs, i.e. for pivoting the limbs, and the entire structure is simplified so that the welding tongs are relatively cost effective and easy to maintain. Moreover, it is noticeable with respect to pneumatically or hydraulically operated drive devices that at the same time the noise pollution is significantly reduced in electrically operated drive devices.

There is a possibility that the drive device and the actuator means are separate means arranged at different locations of the welding tongs. The drive device may for instance extend as a first drive between the actuator ends of the limbs while the actuator means as a second drive is movingly connected with one limb at a spacing to its adjusting ends. In this manner are the drive device and the actuator means separate and can be operated and controlled independent of each other.

To further facilitate the structure of the welding tongs, the drive device and the actuator means may be integrated in an electrically operable adjusting means, which comprises particularly two adjusting elements movable independent of one another, one of which being movingly connected to the adjusting end of a limb. By the fact that the adjusting ends are movable independently, an adjusting or pivoting of the limbs is possible and on the other hand a limb can also be arranged in a selectable locking position.

A preferred embodiment of such an adjusting means can be seen in the fact that the adjusting means comprises two screw thread drives, wherein a respective adjusting element is movable in the axial direction of a spindle of the respective screw thread drive by each of the screw thread drives. The screw thread drives can be controlled differently electrically so that the limbs are adjustable independent of each other and for instance one limb can be fixed in a certain locking position whereas the other limb is movable even farther.

If the limbs are movable in the above described manner independent of each other, it can further be regarded as being favourable if each of the limbs is movable without a flexible connection of the limbs to one another by one adjusting element and can possibly be fixed in a selected locking position. That means that each limb is adjustable in the axial direction of the associated revolving spindle or rotary spindle and each limb is adjustable when moving towards a welding position for passing-by obstacles. Thus, it is for instance possible to be able to move quicker between different welding positions by means of a program-controlled robot. Moreover, it is easily possible to monitor the contact pressure for welding, the pressure during welding or the like to be able to carry out in a simple manner a possibly required readjustment of the respective limbs particularly during the welding process.

The possibility exists that the screw thread drives provided for each limb have a different design, which could for instance result from the different thread pitches of the spindles. Due to such differently structured screw thread drives, the limbs are movable for instance differently fast at an identical number of revolutions of the spindles. To simplify the welding tongs with respect to structure, spare part stock etc. the screw thread drives may have a similar design. An identical spindle, an identical rotating nut or the like can for instance be used for both screw thread drives.

According to the invention the possibility exists that the adjusting elements of the adjusting means are not movable fully independently from one another but can move for instance only at different speeds. This can be achieved in that the adjusting means has a spindle with at least two different spindle sections, wherein an adjusting element is associated to each spindle section. These different spindle sections may for instance be characterized by different thread pitches, wherein the threads have different rotational directions in the respective spindle section. The possibility also exists that the thread pitch in the spindle sections is identical and only the rotational direction of the thread is opposed.

In order to be able to precisely determine with the adjusting means in which position the respective limb is arranged, a position sensor may be associated to each adjusting means.

The possibility also exists that the electrically operated actuator means is an electric linear drive with e.g. a reaction rail and a primary portion.

At this point it must additionally be noted that particularly in the automobile industry, quality measurements are carried out and recorded for a longer period of time for each screw or welding point in connection with fastening by means of screws, welding or the like. It is possible according to the invention to make measuring statements about the different welding points, since it is for instance possible to measure and record the electrode power, changes of the electrode power during the welding process etc. for each welding point. The electrode power is measurable directly by the motor current of the servo motor or also by further power measuring means such as strain gages, load cells or the like in the area of the drive device. In the same manner can a change of the electrode power during the welding process be measured and monitored. Moreover, it is easily possible according to the invention to position the welding electrodes extremely precisely and to track them e.g. for maintaining a certain electrode power.

For such quality statements about the different welding points it is, however, also required that the bearing means between the adjusting lever ends and the drive means are free from backlash. This is enabled by the above-mentioned bearing means with bearing blocks, transverse bores, shafts bevel roller bearings, rest shoulders, insertion caps, intermediate ring and safety sheet.

Such a bearing means free from backlash between the adjusting lever ends and the drive means can of course also be used in drive means other than the one previously described. The respective bearing means should be arranged at least between an end of the drive device for welding tongs and an adjusting lever end of at least one lever of the welding tongs.

BRIEF DESCRIPTION OF THE DRAWINGS

An advantageous embodiment of the invention will now be explained with reference to the Figures of the drawings.

DETAILED DESCRIPTION OF THE INVENTION

Figure 1:
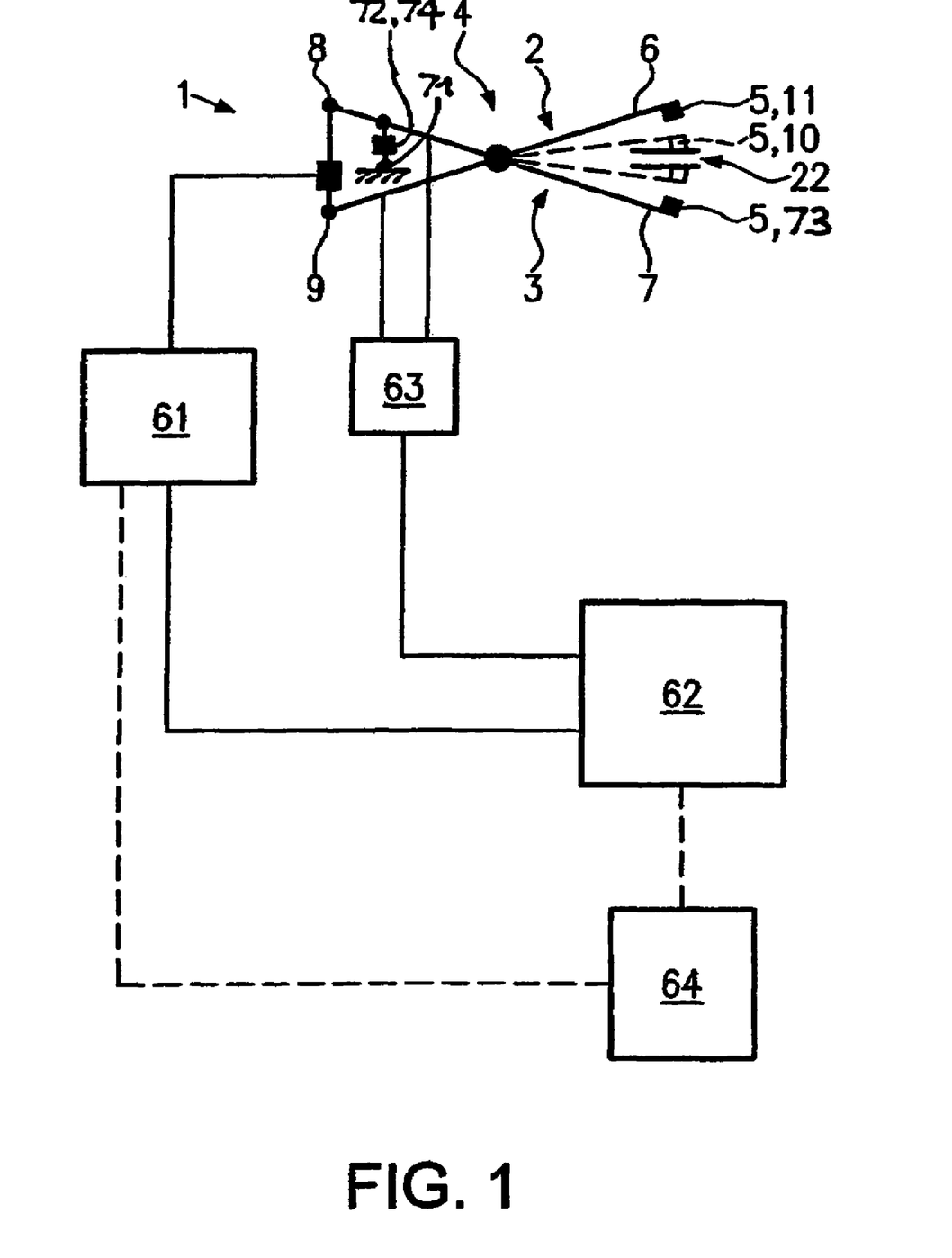
FIG. 1 shows a schematic diagram of a drive device according to the invention for welding tongs with a control.

FIG. 1 shows a schematic diagram of the drive device 1 for welding tongs 4 according to the invention with a respective control. The welding tongs 4 comprise two double-armed levers 2, 3. Respective welding electrodes 5 are arranged on an end of each lever designated as welding lever end 6, 7. The drive device 1 according to the invention is arranged between the adjusting lever ends 8, 9 opposing the welding lever ends 6, 7. In FIG. 1 in the view with the drawn-through lines, the levers 2, 3 are in their standby position and in the dotted view the levers are in their welding position. In the welding position 10 an electrode power is exerted via the welding electrodes 5 onto a workpiece 22 for instance to press two sheets against each other forming the workpiece for subsequently being welded.

The two levers 2, 3 of the welding tongs 4 are connected to a welding control. This welding control supplies power to the levers and thus to the welding electrodes 5 during the welding process. The drive device 1 is connected with a motor control 61. By this motor control the drive device 1 is controlled for pivoting the levers 2, 3 between the welding position 10 and the standby position 11.

At this point it must be noted that any intermediate position between welding and standby position can precisely be adjusted by means of the drive device according to the invention.

In order to control the welding tongs altogether, the motor control 61 and the welding control 63 are connected to a welding tongs control 62.

In order to make a quality statement with respect to each welding point, a quality monitoring means 64 is provided, which is connected to the welding tongs control 62 and to the motor control 61 for data exchange. By means of the quality monitoring means 64 it is possible to monitor and record for each welding point the electrode power, the position of the welding electrodes and the drive device as well as the welding current and possible changes of these parameters before, during and after the welding process. The possibility also exists to operate the motor control 61 via the welding tongs control 62 for instance to control the levers of the welding tongs 4 in a desired manner or to detect a welding with a desired quality.

Figure 2:
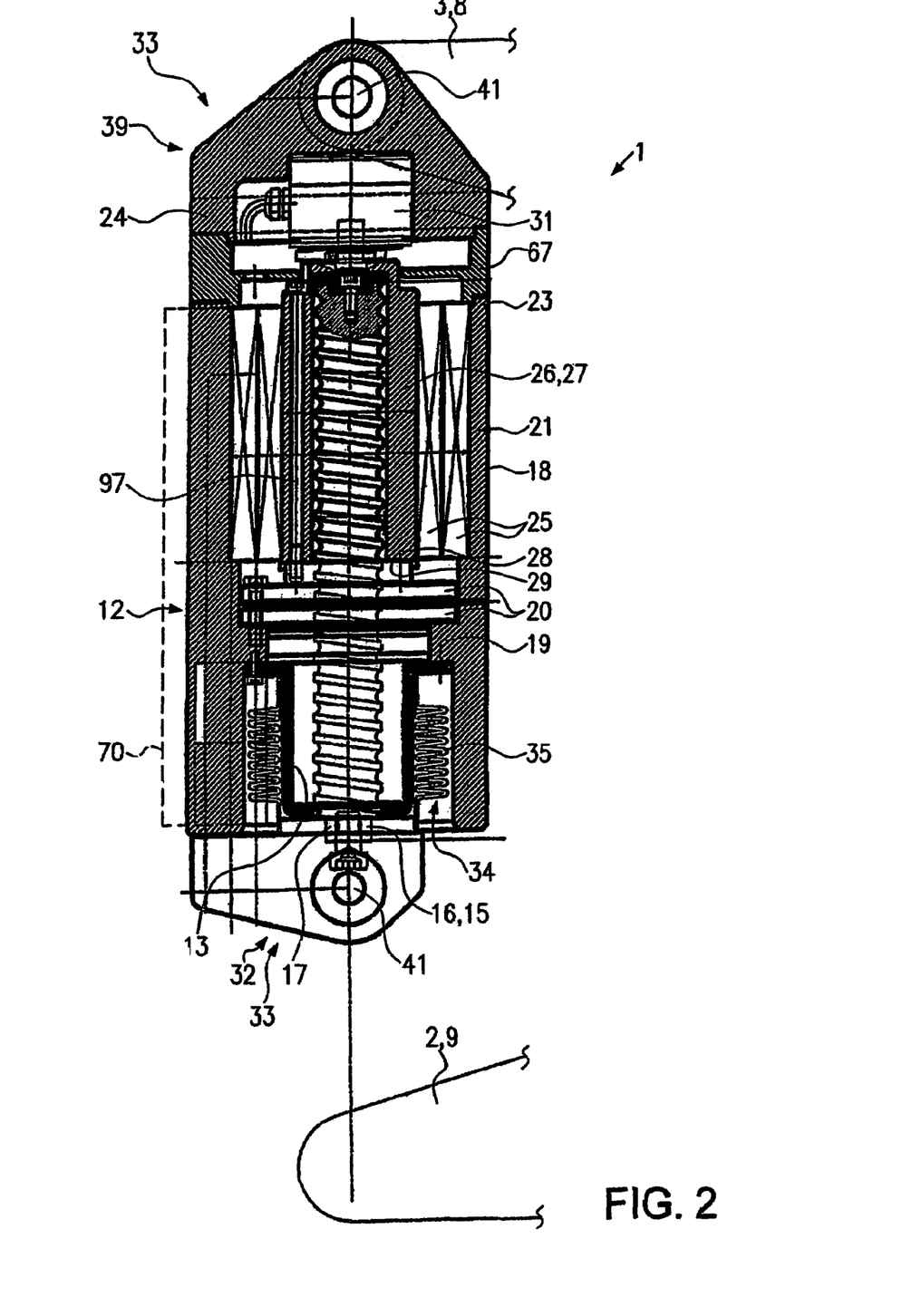
FIG. 2 shows a longitudinal cut through the drive device according to the invention according to FIG. 1.

FIG. 2 shows a longitudinal section through the drive device 1 according to FIG. 1. For reasons of simplification, the respective adjusting lever ends 8, 9 of the levers 2, 3 are not shown or only shown in a schematic diagram.

The drive device 1 has a sleeve-shaped drive housing 18. This housing can be closed at one housing end 23 by a cover 24. An absolute value transmitter 31 is arranged within the drive housing 18, partially also within the cover 24. For reasons of clarity, the respective supply lines of the absolute value transmitter as well as their further transmission outside the drive housing 18 are shown partially only. The absolute value transmitter 31 serves for measuring the position of a rotating nut 13, which is part of a ball thread drive 12. The rotating nut 13 is rotatably supported at a holding shoulder radially projecting towards the inside within the drive housing 18. The rotary support is carried out via a bearing ring 20 as a radial and axial bearing means, which is detachably attached on a side of the holding shoulder 19 facing the cover for instance by means of screws. The rotation ring 13 is rotatable but axially non-displaceably supported in the bearing ring 20.

On the front side 29 facing the cover 24 the rotating nut 13 is detachably connected to a first end 28 of a rotor sleeve 27 of the servo motor 21 formed as a rotor 26. The connection is implemented via a number of screws 67, at least one of which being shown in FIG. 2.

On the second end 30 opposing the first end 28 the rotor sleeve 27 is movingly connected to the absolute value transmitter 31.

A cover 67 is arranged within the rotor sleeve 27 directly adjacent to the absolute value transmitter 31. The rotor sleeve 27 is partially and particularly with its second end 30 guided through this cover.

The stator 25 of the servo motor 21 is arranged around the rotor sleeve 27 within the drive housing 28. The servo motor is particularly formed as a brush-less motor.

Figure 3:
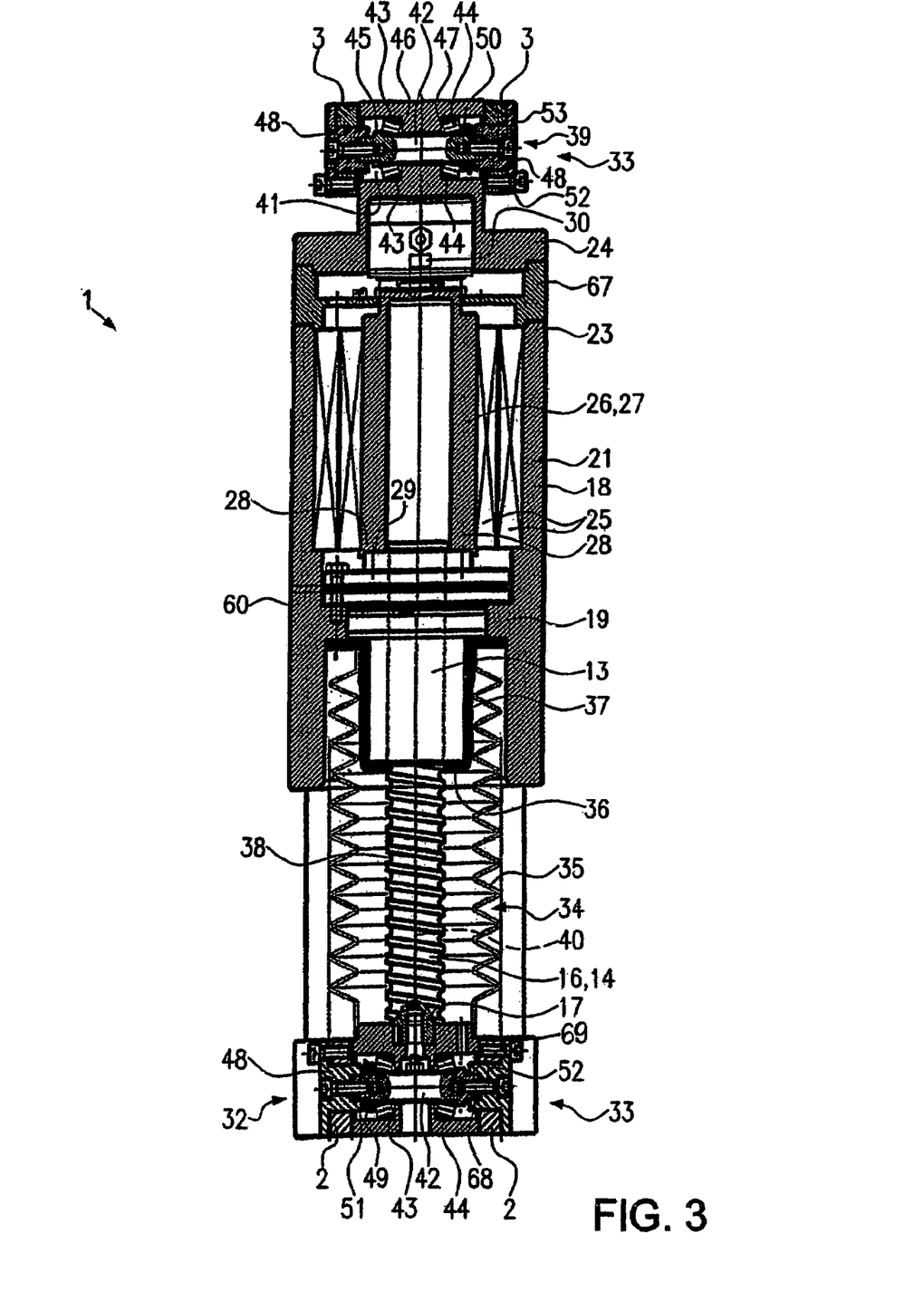
FIG. 3 shows a longitudinal cut through the drive device according to the invention rotated 900 with respect to the longitudinal section according to FIG. 2.

As a further part of the ball screw 12, a spindle 16 is displaceably supported in the rotating nut 13 between the return position 15, see FIG. 2, and the extended position 14, see FIG. 3. In its return position 15 the spindle 16 is substantially completely arranged within the drive housing 18. Its extended end 17 still projects from the rotating nut 13, whereas the remaining part of the spindle 16 is located in the rotating nut 13 or within the rotor sleeve 27. The end opposing the extended end 17 of the spindle is arranged in its return position 15 in the area of the cover 67.

The extended end 17 of the spindle 16 is connected to a first bearing block 32 of a bearing means 33, see also FIG. 3. The extended end 17 is fixed for co-rotation within the first bearing block 32.

The spindle 16 is surrounded by a protective means 34 variable in length between the first bearing block 32 and the holding shoulder 19. This protective means is formed as a bellows 35 connected at its ends with the bearing block 32 or a cover 37, or it is formed as a helical spring cover. The cover 37 covers the rotating nut 13 in a hat-like manner on its end 36 pointing away from the holding shoulder 19. The cover rests on the outer periphery 38 of the spindle 16 adjacent to the end 36 of the rotating nut. The cover 37 is attached for instance by means of screws in the area of the holding shoulder 19 in its side opposing the bearing ring.

A second bearing block 39 is contained in the cover 24 opposite to the first bearing block 32. The two bearing blocks are structured as part of the bearing means 33 substantially similar to the rotatable bearing of the adjusting lever ends 8, 9, see in the respect particularly FIG. 3.

A transverse bore is arranged in each bearing block 32, 39. This bore extends perpendicular to the longitudinal axis 40 of the spindle 16. Within the transverse bore 41 a shaft 42 is rotatably arranged. The rotatable bearing is implemented through a laterally reversed arrangement of two bevel roller bearings 43, 44. In order to fix the bevel roller bearings 43, 44 within the transverse bore 41 and to possibly brace it, appropriate rest shoulders 45, 46 and 47 are provided on the inner periphery of the transverse bore 41 or on the outer periphery of the shaft 42.

It must be noted that the arrangement of the respective rest shoulders in the first and second bearing block 32, 39 can be made in the reversed manner so that in the first bearing block 32 the bracing or pretension of the two bevel roller bearings 43, 44 can be made in FIG. 3 from the right and in the second bearing block 39 in FIG. 3 from the left.

In the first bearing block 32 the bevel roller bearing 43 is fixed between the rest shoulders 45 and 46 on the shaft 42 and on the transverse bore 41. The other bevel roller bearing 44 is held between a further rest shoulder 47 on the transverse bore 41 and a rest surface 50 of an intermediate ring or thread ring 49 fastened on the shaft by means of screws, particularly for the purpose of pretension. The intermediate ring 49 is screwed on before inserting the respective insertion cap 48 in the direction towards the bevel roller bearing 44 and it is secured by means of a safety sheet 51 also set onto the shaft 42 in its screw-on position.

The attachment of the insertion caps is implemented by respective screws, which attach the insertion caps 48 at the respective ends of the shaft 42. The shaft ends 69 are received by conically formed plug-on bores 68 of the insertion caps.

The respective adjusting lever end 48, 49 is arranged between a rest flange 50 formed on the ends 53 of the insertion caps 48 pointing away from the shaft 42 and ends of the respective transverse bore 41. It comprises, see also FIG. 5, fork ends 65, 66, which are arranged on both sides of the respective bearing block 32, 39. In order to fix the fork ends on the respective insertion cap 48, this cap comprises at least one screw bore 52, through which a respective screw can be screwed in up to the fork ends.

The structure of the second bearing block 39 is analogue. Furthermore, it must be noted with respect to the second bearing block, that with this block the extended end 17 of the spindle 16 is detachably attached by means of a respective screw, see FIG. 3.

Cooling ribs 70 are arranged on an outer side of the drive housing 28, see the dotted illustration in FIG. 2. The cooling ribs may be attached both in the longitudinal direction and in the radial direction. Other arrangements are also possible.

Furthermore, at least one lubricant supply channel is shown as part of a lubricant distribution system 60, through which said channel lubricant can be supplied from the outside to the screw thread drive with the radial and axial bearing means and to the bearing means formed by the bearing blocks 33.

Figure 4:
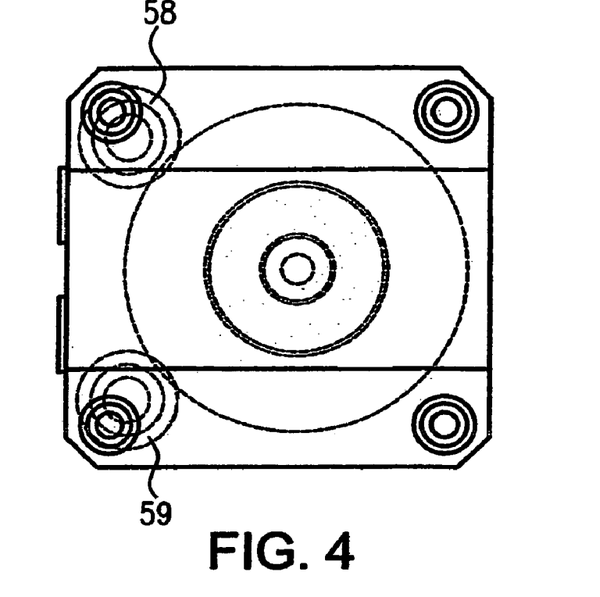
FIG. 4 shows a top plan view onto the drive device according to FIG. 1.
Figure 5:
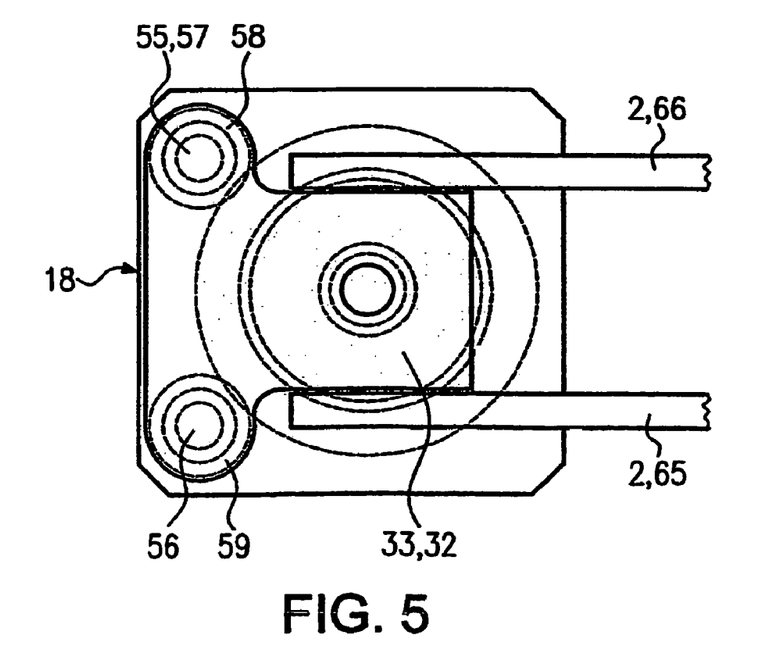
FIG. 5 shows a sub-view of the drive device according to FIG. 1.

In FIGS. 4 and 5, which correspond to a top plan view or bottom view of the drive device 1 according to FIG. 1 according to the invention, guide rods 55 and 56 can particularly be seen. These rods serve for receiving moments of tilt and torques transmitted onto the drive device 1 when operating the welding tongs. The guide rods extend in parallel to the longitudinal direction 40 of the spindle 16 within the drive housing 18. In this housing respective longitudinal bores 58, 59 are formed in extension of the adjusting lever ends 8, 9 and fork ends 65, 66, respectively. On ends 57 of the guide rods 55, 56, the rods are attached at the drive housing 18.

Figure 6:
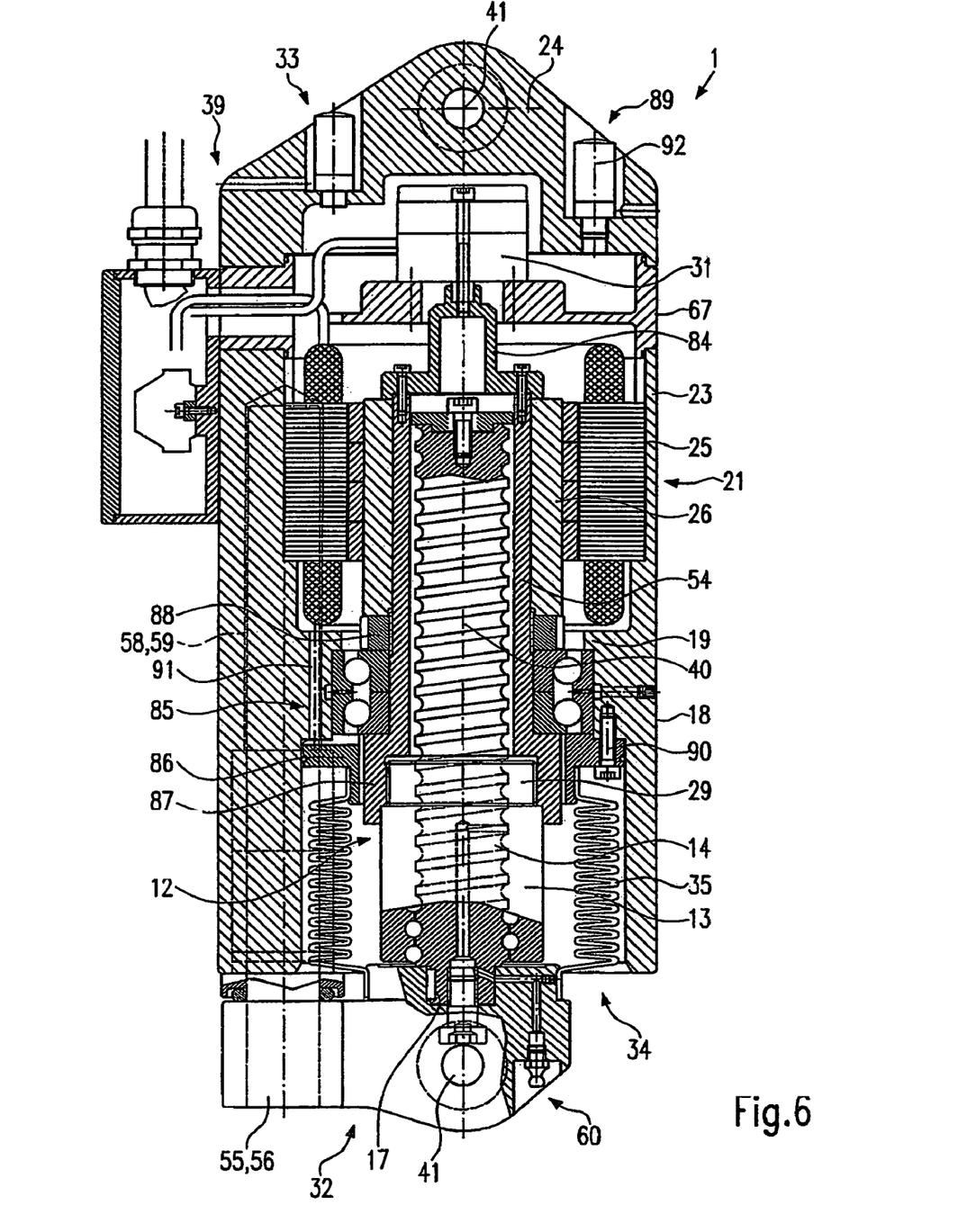
FIG. 6 shows a longitudinal section through a further embodiment of the drive device according to FIG. 1 according to the invention.

FIG. 6 shows a longitudinal section through a second embodiment of the drive device according to FIG. 1 according to the invention, with identical components as in FIG. 2, wherein some details referring to the welding tongs per se are not shown.

Only the substantial differences between the two embodiments will now be described.

In FIG. 6 the spindle 14 is arranged in a spindle sleeve 54, which extends between the rotating nut 13 and a rotary cap 84. The rotary cap is associated to the position transmitter 31, so that this transmitter determines via the rotation of the rotary cap to a respective rotary position of the spindle sleeve 54 and the rotating nut 13, respectively, and thus the spindle 14.

The spindle sleeve 54 comprises a stepped section 87 on its end pointing towards the rotating nut 13, said stepped section projecting radially towards the outside. The rotor 26 is arranged on an outer side of the spindle sleeve 54 in the area of the servo motor 21, and this rotor can be rotated together with the spindle sleeve 54. To attach the rotor 26 in the spindle sleeve 54 a ring element 91 is arranged on an outer side of the spindle sleeve between which and a radially outwardly projecting flange of the rotary cap 84 the rotor 26 is fixed for co-rotation.

An intermediate ring 88 is arranged adjacent to the rotor 26. Between this ring and the radially outwardly projecting stepped section 87 a bearing means 85 is arranged for the rotatable support of the spindle sleeve 54 within the drive housing 18.

For further fixing the bearing means 85, an additional attachment ring 86 is provided, which is detachably attached for instance by means of screws at the drive housing 18 in the area of the stepped section 87. The attachment ring 86 at the same time serves for the radial and rotatable support of the stepped section 87.

The rotating nut 13 is attached within the stepped section 87 particularly in the area of its front side 29 so that the rotating nut 13 rotates together with the spindle sleeve 54 but is undisplaceable in the axial direction.

FIG. 6 shows the lubricant distribution system 60 through which the lubricant may be supplied from the outside particularly to the screw thread drive 12.

In order to be able to ventilate the bellows 35 as protective means 34 during moving the spindle 14 in and out, a ventilation means 89 is provided which connects an interior of the bellows with the outer environment of the drive device 1 via lines 91, one of which being shown, as well as via air exchange dampers 92.

FIG. 1 further shows a schematic view of welding tongs 1 with two levers or limbs 2, 3.

The embodiment of the welding tongs shown is an example of so-called X-welding tongs.

A fixing means 72 in the form of an actuator means 74 is associated at least to one limb 3. This actuator means extends between a fixed point 71 and the respective limb 3. A selectable locking position 73 of the limb 3 can be defined by the locking means 72 and the actuator means 74, respectively. This applies analogously also for other welding tongs, for instance C-welding tongs.

Of course, it is also possible to analogously arrange a respective fixing means or actuator means additionally or alternatively on the other limb.

The actuator means (74) (secondary drive) is structured analogously to the drive device I as a main drive, wherein both may differ in power or maximal power development.

Figure 7:
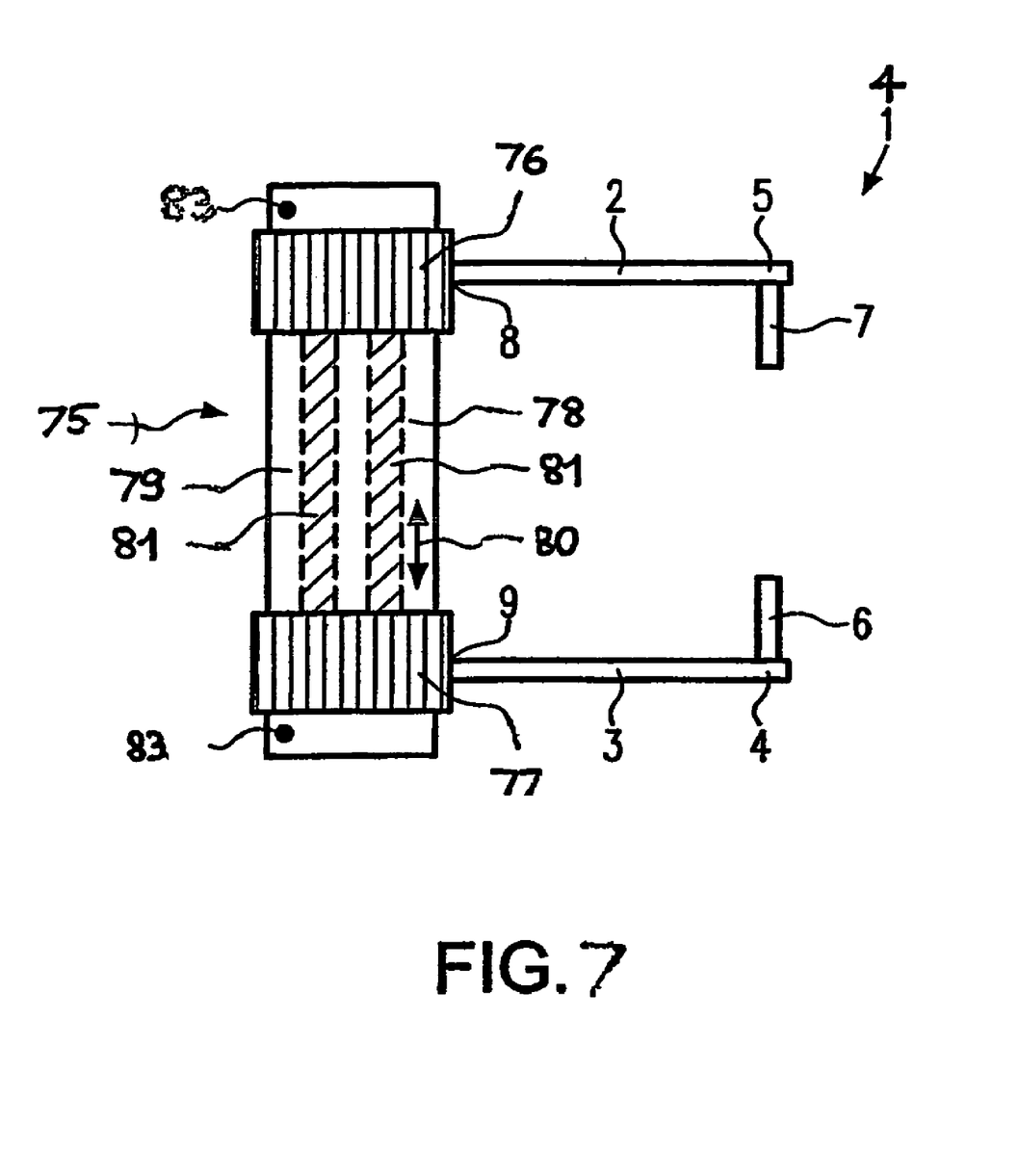
FIG. 7 shows a side view of a drive device and actuator device integrated into an adjusting means.

FIG. 7 shows another embodiment of the drive device 10 and the locking means 72 and actuator means 74, respectively. In this embodiment, the drive device 10 and the actuator means 74 are integrated in an adjusting means 75.

The adjusting means 75 substantially comprises two adjusting elements 76, 77, which are movable by respective screw thread drives 78, 79 with the associated spindles 81 independent of one another in the axial direction of the respective spindles. The rotation of the respective spindles 81 can be implemented analogously to FIG. 2, i.e. by using the rotating nut 13 and the electric motor-driven drive 21. A respective rotating nut and a respective electric motor-driven drive is associated to each screw thread drive 78, 79.

A respective limb 2, 3 is arranged at each adjusting element 76, 77, wherein no joint connection or another movement connection exists between the limbs 2, 3 of the welding tongs 3. That means that the limbs 2, 3 are movable independent of each other.

The adjusting elements 76, 77 may substantially also be formed as a bearing block 32, 39, see FIG. 2, wherein, however, a separate spindle and thus a separate screw thread drive 78, 79 is associated to each bearing block.

In order to be able to monitor and control the adjustment of each screw thread drive and thus of each limb 2, 3, respective position sensors 83 are associated e.g. to the respective adjusting element 76, 77. The allocation of the position sensor can, however, also be implemented according to FIG. 2, see reference numeral 31 for the respective position sensor. The position sensor 31 according to FIG. 2 detects for instance a respective rotary position of the rotor sleeve 27 and spindle, respectively, wherein each of the position sensors is preferably formed as an absolute value transmitter.

In the embodiment according to FIG. 7, it is also possible as an alternative that only one spindle 82 and accordingly only one screw thread drive 78, 79 is provided. The adjusting elements 76, 77 are associated to different spindle sections, which are arranged in axial direction 90 in juxtaposition. The spindle sections may for instance differ by thread pitch and in any case they comprise a different thread orientation so that when rotating the spindle 81 in a direction of rotation, the adjusting elements 76, 77 movably connected to the spindle adjust in opposite axial directions 80.

Besides a simple tongs compensation a torque compensation is also enabled by the invention particularly by means of the separate locking means 72 or by means of the locking means integrated in the drive device 1. The latter for instance leads to the fact that the welding tongs 4, see FIG. 1, are less loaded by respective torques in the area of their pivot axis.

The drive device 1 according to the invention has an extremely small construction length, see FIG. 2, wherein in the return direction 15 of the spindle 16 the screw thread drive 12 as well as the servo motor are arranged substantially fully within the drive housing 18. Furthermore, the drive device I is extremely compact, since the guide rods 55, 56 are integrated in the drive housing 18. Due to the use of the electric motor driven drive in connection with the screw thread drive 12 a simple possibility of adjusting the levers of the welding tongs is created, wherein the adjustment is implemented in an accurate manner precisely to reproduce. All intermediate positions between the welding position and the standby position, see FIG. 1, the levers of the welding tongs 4, can be adjusted in a controlled manner so that for instance the welding tongs after terminating a welding process and moving to the next welding position must be opened only as far as necessary.

Furthermore, besides the positions of the levers or welding electrodes, the electrode power and the respective changes of the electrode power can be measured by means of the drive device 1 according to the invention.

The invention claimed is:

1. A drive device for welding tongs comprising a pair of limbs formed as double-armed levers, each said lever having an adjusting end and a welding end with a welding electrode, said drive device for adjusting at least one lever between a welding and a standby position and being arranged substantially between said adjusting ends of the respective levers, said drive device comprising an electric motor-driven screw thread drive with a rotating nut and a spindle axially displaceable betwwen an extended and a return position, said spindle having a free extended end movingly connected with one of said adjusting ends of said levers, and a sleeve-shaped drive housing with an at least partially revolving holding shoulder, the rotating nut being supported on the holding shoulder in a rotatable but axially immovable manner.

2. The drive device as claimed in claim 1, wherein the rotating nut comprises integrated radial and axial bearing means.

3. The drive device as claimed in claim 2, wherein a bearing ring of the radial and axial bearing means is fixed for co-rotation with and is detachable with the holing shoulder, wherein the rotating nut is rotatable relative to the bearing ring.

4. The drive device as claimed in claim1, wherein the screw thread drive is formed as a ball drive.

5. The drive device as claimed in claim 2, wherein the rotating nut is pre-loaded for a bearing free from backlash.

6. The drive device as claimed in claim 1, the electric motor-driven drive comprises a brushless servo motor.

7. The drive device as claimed in claim 6, wherein the servo motor comprises a stator arranged within the drive housing in a manner fixed for co-rotation, and a rotor rotatably arranged threein which movingly connected to the rotating nut in a non-positive way.

8. The drive device as claimed in claim 7, wherein the rotor is formed as a rotor sleeve in which the spindle is partially retracted at least in its return position.

9. The drive device as claimed in claim 8, wherein the rotor sleeve is fixed for co-rotation with the rotating nut on its front side at a first end of the rotor sleeve pointing away from the cover.

10. The drive device as claimed in claim 8, wherein a position transmitter is associated to the rotating nut and/or the rotor sleeve.

11. The drive device as claimed in claim 10, wherein the position transmitter is an absolute value transmitter.

12. The drive device as claimed in claim 1, wherein the drive housing is releasably locked by a cover at its housing end opposing the free extended end of the spindle.

13. The drive device as claimed in claim 12, wherein a first bearing block is releasably arranged at the free extended end of the spindle as a bearing means for the adjusting end of one of said levers.

14. The drive device as claimed in claim 13, wherein the free extended end is fixed for co-rotation in the first bearing block.

15. The drive device as claimed in claim 13, wherein a protective means variable in length surrounding the spindle is arranged substantially between the bearing block and the holding shoulder.

16. The drive device as claimed in claim 15, wherein the protective means is formed as a helical cover.

17. The drive device as claimed in claim 15, wherein the protective means is formed as a bellows.

18. The drive device as claimed in claim 15, wherein ventilation means is associated to the protective means.

19. The drive device as claimed in claim 13, wherein the cove comprises a second bearing block as a bearing means for supporting the adjusting end of the othe of said levers.

20. The drive device as claimed in claim 19, wherein each bearing block comprises a transverse bore extending substantially perpendicular to a longitudinal axis of the spindle, in which transvrese bore a shaft detachably connected to one of said adjusting ends is rotatably supported.

21. The drive means as claimed in claim 2, wherein at least two taper roller bearings are set onto the shaft in alaterally reversed arrangement.

22. The drive device as claimed in claim 21, wherein each tapered roller bearing is laterally loaded for a support free from backlash.

23. The drive device as claimed in claim 20, wherein opposing abutment shoulders for the taper roller bearings are arranged within the transverse bore and/or on the shaft.

24. The drive device as claimed in claim 20, wherein insertion caps are arranged on both sides of the transverse bore at the shaft, said insertion caps being detachably attached and comprising conical attachment bores.

25. The drive device as claimed in claim 24, wherein each insertion cap receives a shaft end in its attachment bore and is detachably connected with this shaft end by screwing.

26. The drive device as claimed in claim 24, wherein a safety sheet is arranged between the insertion capand the intermediate ring.

27. The drive device as claimed in claim 20, wherein at least one intermediate ring that is screwed onto the shaft exist as a lateral, adjustable abutment surface for a taper roller bearing.

28. The drive device as claimed in claim 20, wherein at least two guide rods are arranged substantially parallel to the longitudinal axis of the spindle, which are attached at least at their ends with the drive housing and/or the bearing means.

29. The drive device as claimed in claim 28, wherein each guide rod is guided in a longitudinal bore within the drive housing.

30. The drive device as claimed in claim 29, wherein each longitudinal bore is arranged substantially in extension of the adjusting lever end.

31. The drive device as claimed in claim 1, wherein cooling ribs are arranged on the ouside of the drive housing.

32. The drive device as claimed in claim 1, wherein a lubricant distributing system with at least one lubricant supply channel is integrated within the drive housing and/or within the bearing means.

33. The drive device as claimed in claim 1, wherein the spindle is arranged in a spindle sleeve which is rotatably connected to the rotating nut.

34. The drive device as claimed in claim 33, wherein a rotor is arranged outside of the spindle sleeve.

35. The drive device as claimed in claim 33, wherein a rotary cap is releasably attached at the end of the spindle sleeve opposing the rotating nut.

36. The drive device as claimed in claim 33, wherein a bearing means is arranged between the spindle sleeve and the drive housing.

37. The drive device as claimed in claim 36, wherein a bearing means is arranged between the spindle sleeve and the drive housing.

38. The drive device as claimed in claim 37, wherein an attachment ring is associated to the radially outwardly projecting step section of the spindle sleeve.

39. The drive device as claimed in claim 1, wherein the holding shoulder is arranged between the electric motor and the rotating nut.

\* \* \* \* \*

UNITED STATES PATENT AND TRADEMARK OFFICE
CERTIFICATE OF CORRECTION

PATENT NO. : 7,435,924 B2
APPLICATION NO. : 10/503756
DATED : October 14, 2008
INVENTOR(S) : Stefan Schmitt-Walter and Robert Hartmann It is certified that error appears in the above-identified patent and that said Letters Patent is hereby corrected as shown below:

On the title page, item (22) and in column 1, the PCT filing date should be changed from "May 5, 2003" to --February 5, 2003--

Signed and Sealed this

Sixth Day of January, 2009

JON W. DUDAS
*Director of the United States Patent and Trademark Office*